(12) United States Patent
Hedman

(10) Patent No.: US 11,812,370 B2
(45) Date of Patent: Nov. 7, 2023

(54) APPARATUSES, METHODS, COMPUTER PROGRAMS, AND COMPUTER PROGRAM PRODUCTS FOR SUPPORTING MUTUALLY EXCLUSIVE ACCESS TO NETWORK SLICES

(71) Applicant: Telefonaktiebolaget LM Ericsson (publ), Stockholm (SE)

(72) Inventor: Peter Hedman, Helsingborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 4 days.

(21) Appl. No.: 17/284,387

(22) PCT Filed: Oct. 9, 2019

(86) PCT No.: PCT/EP2019/077342
§ 371 (c)(1),
(2) Date: Apr. 9, 2021

(87) PCT Pub. No.: WO2020/074573
PCT Pub. Date: Apr. 16, 2020

(65) Prior Publication Data
US 2021/0337465 A1    Oct. 28, 2021

Related U.S. Application Data

(60) Provisional application No. 62/743,271, filed on Oct. 9, 2018.

(51) Int. Cl.
*H04W 48/16* (2009.01)
*H04W 76/27* (2018.01)
(Continued)

(52) U.S. Cl.
CPC .............. *H04W 48/16* (2013.01); *H04W 8/02* (2013.01); *H04W 48/18* (2013.01); *H04W 60/00* (2013.01); *H04W 76/27* (2018.02)

(58) Field of Classification Search
CPC ....... H04W 48/16; H04W 8/02; H04W 48/18; H04W 60/00; H04W 76/27
See application file for complete search history.

(56) References Cited

U.S. PATENT DOCUMENTS 11,102,827 B2   8/2021   Shimojou et al.
2007/0298725 A1  12/2007   Ryu
(Continued)

FOREIGN PATENT DOCUMENTS

EP   2025187 B1   5/2012
EP   2663154 A1   11/2013
(Continued)

OTHER PUBLICATIONS

International Search Report and the Written Opinion of the International Searching Authority, issued in corresponding International Application No. PCT/EP2019/077342, dated Dec. 16, 2019, 8 pages.
(Continued)

*Primary Examiner* — Marcus Hammonds
(74) *Attorney, Agent, or Firm* — ROTHWELL, FIGG, ERNST & MANBECK, P.C.

(57) ABSTRACT

A method is provided. The method includes a User Equipment (UE) determining whether to request access to a Mutually Exclusive Access to Network Slices (MEANS) group from a CM-IDLE state or from a CM-CONNECTED state.

14 Claims, 4 Drawing Sheets

(51) Int. Cl.
*H04W 8/02* (2009.01)
*H04W 48/18* (2009.01)
*H04W 60/00* (2009.01)

(56) References Cited

U.S. PATENT DOCUMENTS

| | | | |
|---|---|---|---|
| 2009/0176513 | A1 | 7/2009 | Bosch et al. |
| 2013/0294293 | A1 | 11/2013 | Iwai |
| 2018/0227873 | A1 | 8/2018 | Vrzic et al. |
| 2020/0008139 | A1* | 1/2020 | Lai ................ H04W 48/16 |
| 2020/0107250 | A1* | 4/2020 | So ................. H04W 48/18 |
| 2021/0250854 | A1* | 8/2021 | Olvera-Hernandez ............ H04W 48/18 |

FOREIGN PATENT DOCUMENTS

| | | | |
|---|---|---|---|
| EP | 2232933 | B1 | 12/2018 |
| JP | 2018160772 | A | 10/2018 |
| RU | 2464743 | C2 | 10/2012 |
| RU | 2498535 | C2 | 11/2013 |
| RU | 2579963 | C2 | 4/2016 |
| WO | 2007142452 | A2 | 12/2007 |
| WO | 2009089005 | A2 | 7/2009 |
| WO | 2018019184 | A1 | 2/2018 |

OTHER PUBLICATIONS

3GPP TR 23.740, V0.5.0 (Aug. 2018), 3rd Generation Partnership Project; Technical Specification Group Services and System Aspects; Study on Enhancement of Network Slicing (Release 16), Aug. 2018, 55 pages.

Huawei et al. "Solutions for MEANS (Mutually Exclusive Access to Network Slices)" 3GPP TSG-SA WG 2 Meeting #128, S2-187249, Jul. 2-6, 2018, Vilnius, Lithuania, 17 pages.

Samsung et al. "TS 23.501: Slice coexistence—isolated slices" SA WG2 Meeting #122, Jun. 26-30, 2017, San José del Cabo, México, S2-174649, 3 pages.

Nokia et al. "update of solution 6.3 on UE awareness of coexistence rules" SA WG2 Meeting #128, Sophia Antipolis, France, Aug. 20-24, 2018, S2-188475, 1 page.

* cited by examiner

APPARATUSES, METHODS, COMPUTER PROGRAMS, AND COMPUTER PROGRAM PRODUCTS FOR SUPPORTING MUTUALLY EXCLUSIVE ACCESS TO NETWORK SLICES

CROSS REFERENCE TO RELATED APPLICATION(S)

This application is a 35 U.S.C. § 371 National Phase of PCT/EP2019/077342, filed Oct. 9, 2019, designating the United States, which claims the benefit of U.S. Provisional Application No. 62/743,271, filed Oct. 9, 2018, the disclosures of which are incorporated herein by this reference.

TECHNICAL FIELD

Disclosed are embodiments related to mutually exclusive access to network slices (MEANS).

BACKGROUND

The 3gpp TR 23.740 V0.5.0 presents as a key issue ("Key Issue #1"), "Mutually Exclusive Access to Network Slices" (MEANS). TR 23.740 states that several scenarios addressing access control to mutually exclusive Network Slices have been identified, i.e. due to deployment, regulation or per SLA, some UEs may be restricted from using two services (S-NSSAIs) simultaneously.

This issue has presented a number of questions that must be addressed.

SUMMARY

According to some embodiments, a change of a MEANS group possibly can be done from either a CM-CONNECTED state or from a CM-IDLE state, with or without indicating a Globally Unique AMF ID (GUAMI).

The above and other embodiments are described below.

BRIEF DESCRIPTION OF THE DRAWINGS

The accompanying drawings, which are incorporated herein and form part of the specification, illustrate various embodiments.

DETAILED DESCRIPTION

Figure 1:
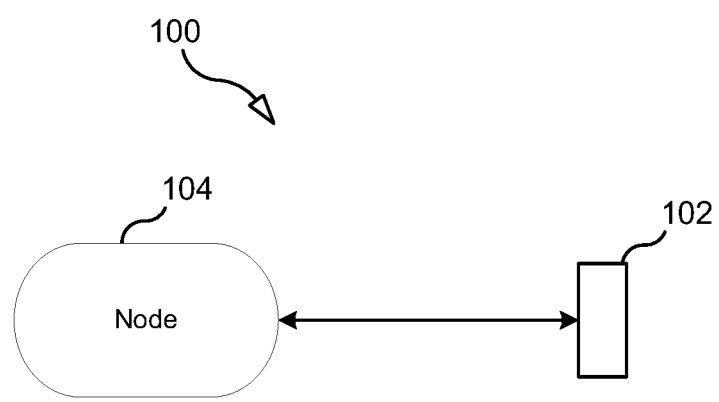
FIG. 1 illustrates a network architecture according to some embodiments.

FIG. 1 illustrates system 100, including a User Equipment (UE) 102 and a network node 104. Network node 104 may include an AMF. UE 102 and network node 104 may be communicatively coupled to each other, such as, for example, through 3G, 4G, 5G network protocols.

A UE may try to add another Single Network Slice Selection Assistance Information (S-NSSAI) from the Configured NSSAI while the UE is in CM-CONNECTED or from CM-IDLE while still indicating the valid GUAMI. However, MEANS seems to drive the need for the UE to access the network again from CM-IDLE without indicating GUAMI from an old registration so as to allow the 5G-AN to select 5GC based on a Requested NSSAI. Another option would be to allow re-allocation to new slices while the UE is in the state CM-CONNECTED.

Regarding not requiring UEs to go through CM-IDLE when re-allocation of network slices are possible while in CM-CONNECTED, it is proposed that the network should be able to indicate whether the UE shall request access to another MEANS group from CM-IDLE without indicating GUAMI or 5G-S-TMSI in 5G-AN signalling (i.e. to trigger the 5G-AN to do the selection) or whether the UE can request such access while in CM-CONNECTED (i.e. as 5GS will enable re-allocation even if e.g. PDU Session for another MEANS group is established). In embodiments, the indication may either be provided together with information about the MEANS groups provided to the UE, or the indication may be sent by the AMF separately. If sent separately, the information could be to which MEANS group(s) the UE may use the more efficient change while being connected to the current AMF i.e. while in CM-CONNECTED. Alternatively the UE may be configured with the information.

Such indication can be provided independent of how MEANS groups are communicated to the UE and realized in the network.

In embodiments, the network, e.g. AMF, may indicate to which MEANS groups the UE can use the more efficient re-allocation while staying in CM-CONNECTED for the current Registration (Allowed NSSAI). The network, e.g. AMF, may provide such information as part of the Registration Accept message or as part of UE Configuration Update procedure. Other ways of providing such information are also possible, and may depend on the particular approach to providing MEANS groups.

Embodiments enable the UE to know whether an efficient re-allocation/change of Network Slices (e.g. changing the Requested NSSAI compared to Allowed NSSAI by e.g. adding more S-NSSAIs from the Configured NSSAI) or MEANS group can be enabled while the UE is in CM-CONNECTED or whether the UE has to go through CM-IDLE state.

Figure 2:
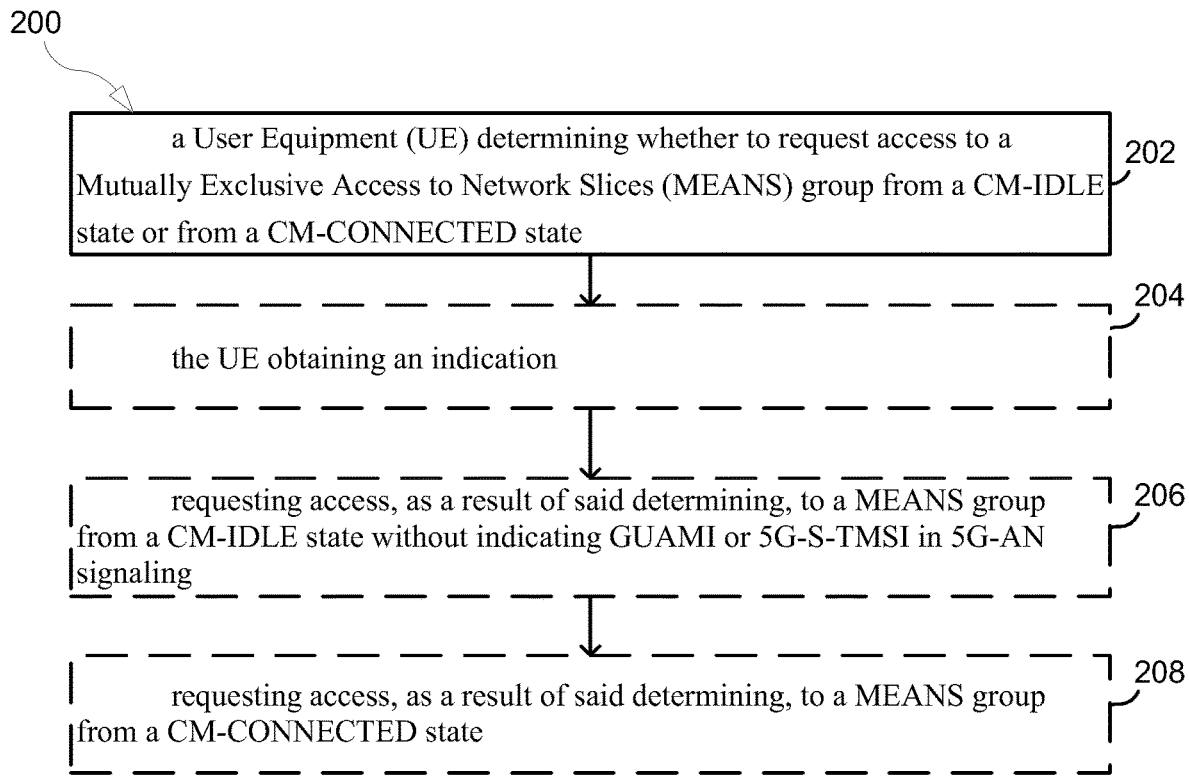
FIG. 2. is a flow chart illustrating a process according to some embodiments.

FIG. 2 illustrates a process 200 according to some embodiments. Process 200 is a method that includes a User Equipment (UE) determining whether to request access to a Mutually Exclusive Access to Network Slices (MEANS) group from a CM-IDLE state or from a CM-CONNECTED state (step 202).

In some embodiments, the method further includes the UE obtaining an indication (step 204). The determining whether to request access to a MEANS group from a CM-IDLE state or from a CM-CONNECTED state further comprises using the indication.

In some embodiments, obtaining the indication comprises receiving the indication from an AMF. In embodiments, the indication is contained in a Registration Accept message and/or a UE Configuration Update message. In embodiments, the indication is configured in the UE.

In some embodiments, the UE determines to request access to a MEANS group from a CM-IDLE state. The method may further include requesting access, as a result of said determining, to a MEANS group from a CM-IDLE state without indicating GUAMI or 5G-S-TMSI in 5G-AN signaling (step 206).

In some embodiments, the UE determines to request access to a MEANS group from a CM-CONNECTED state. The method may further include requesting access, as a result of said determining, to a MEANS group from a CM-CONNECTED state (step 208).

In some embodiments, the indication contains information about one or more MEANS groups that the UE may change to while being connected to a current AMF.

In some embodiments, the UE makes the determination independent of UE awareness of MEANS groups. In some embodiments, the UE makes the determination when the UE adds new S-NSSAIs to the Requested NSSAI relative to the Allowed NSSAI. In some embodiments, the UE makes the determination when the UE removes S-NSSAIs in the Requested NSSAI relative to the Allowed NSSAI. In some embodiments, the UE makes the determination when the UE completely changes the S-NSSAIs in the Requested NSSAI relative to the Allowed NSSAI.

Figure 3:
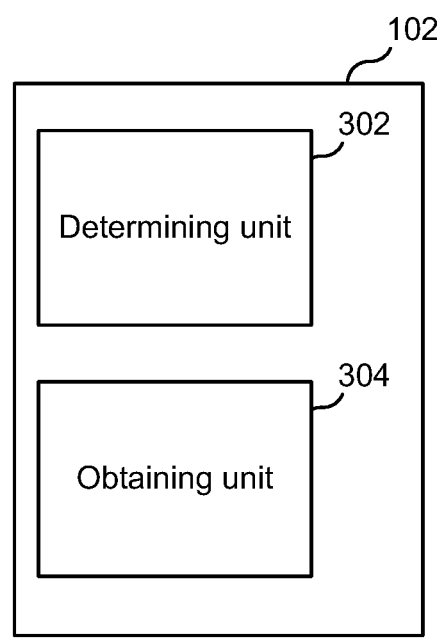
FIG. 3 is a diagram showing functional modules of a UE according to some embodiments.

FIG. 3 is a diagram showing functional modules of UE 102 according to some embodiments. As shown in FIG. 2, UE 102 includes a determining unit 302 and an obtaining unit 304. Determining unit 302 may be configured to determine whether to request access to a Mutually Exclusive Access to Network Slices (MEANS) group from a CM-IDLE state or from a CM-CONNECTED state. Obtaining unit 304 may be configured to obtain an indication. In some embodiments, determining unit 302 is further configured to use the indication to make its determination.

Figure 4:
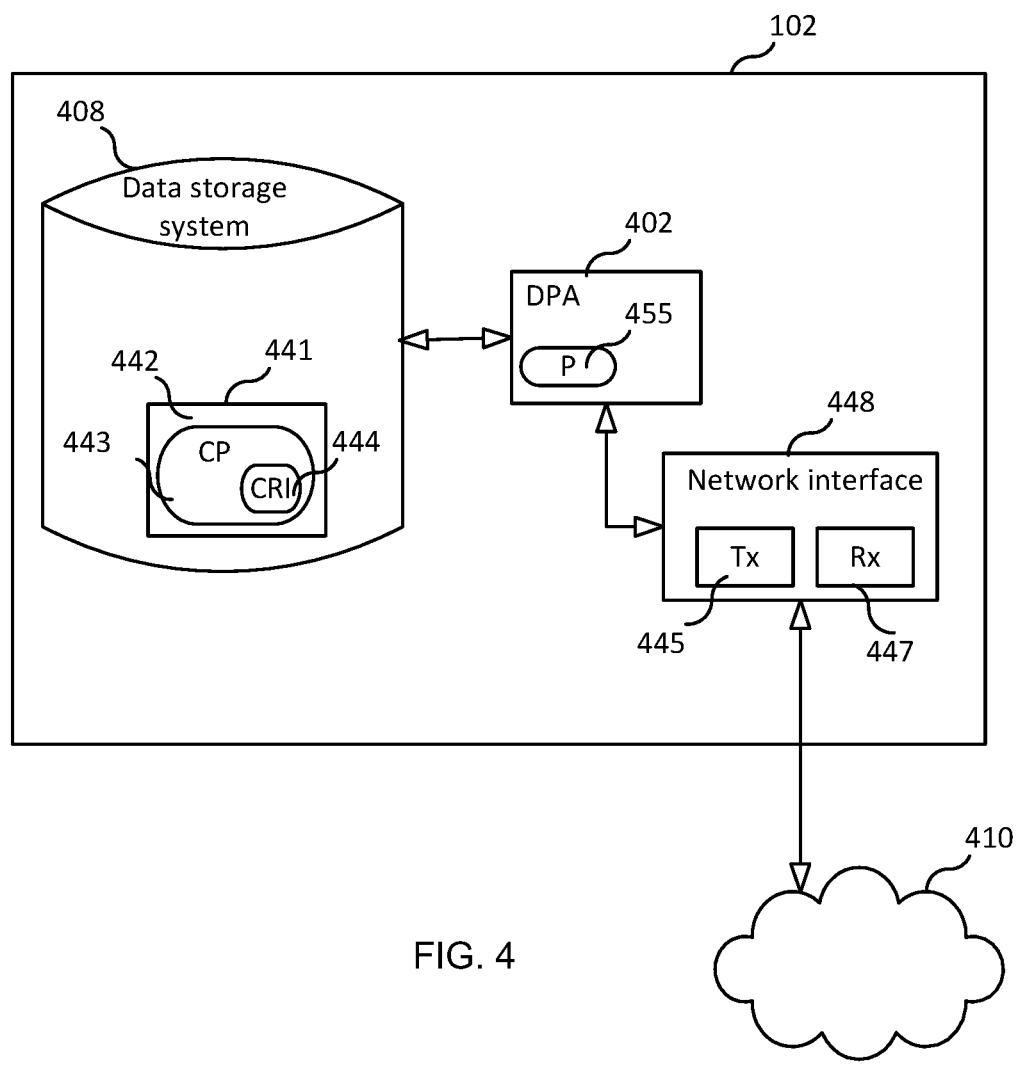
FIG. 4 is a block diagram of a UE according to some embodiments.

FIG. 4 is a block diagram of UE 102 according to some embodiments. As shown in FIG. 4, UE 102 may comprise: a data processing apparatus (DPA) 402, which may include one or more processors (P) 455 (e.g., a general purpose microprocessor and/or one or more other processors, such as an application specific integrated circuit (ASIC), field-programmable gate arrays (FPGAs), and the like); a transmitter 445 and a receiver 447 coupled to a network interface 448 for enabling UE 102 to transmit data to and receive data from an AN node (e.g., base station); and local storage unit (a.k.a., "data storage system") 408, which may include one or more non-volatile storage devices and/or one or more volatile storage devices (e.g., random access memory (RAM)). In embodiments where UE 102 includes a general purpose microprocessor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, but not limited to, magnetic media (e.g., a hard disk), optical media, memory devices (e.g., random access memory), and the like. In some embodiments, the CRI 444 of computer program 443 is configured such that when executed by data processing apparatus 402, the CRI causes UE 102 to perform steps described above (e.g., steps described above with reference to the flow charts). In other embodiments, UE 102 may be configured to perform steps described herein without the need for code. That is, for example, data processing apparatus 402 may consist merely of one or more ASICs. Hence, the features of the embodiments described herein may be implemented in hardware and/or software.

Embodiments herein can be used as a complement when the UE has learned which S-NSSAIs are part of which MEANS group, or it can be used independent of such knowledge.

Mutually Exclusive Access to Network Slices: The access to Network Slices is considered to be mutually exclusive for a UE when their respective S-NSSAIs are both present in the UE's subscription and the UE is prevented from accessing both S-NSSAIs simultaneously.

For the purpose of this discussion, a MEANS group is assumed to be one or more Network Slices which are Mutually Exclusive from other Network Slices. Other names may be used to refer to one or more Network Slices which are Mutually Exclusive from other Network Slices.

In Rel-15 a UE likely will simply try to add another S-NSSAI from the Configured NSSAI while the UE is in CM-CONNECTED or from CM-IDLE while still indicating the valid GUAMI. However, MEANS seems to drive the need for the UE to access the network again from CM-IDLE without indicating GUAMI from old registration so as to allow the 5G-AN to select 5GC based on Requested NSSAI. The other option would be to allow re-allocation to new slices while the UE is in state CM-CONNECTED which is not yet fully functional. Later 3GPP releases (e.g., as part of FS_ETSUN study item) may solve it, but it seems uncertain whether that will be enabled in Rel-16. Independent of if it is enabled by FS_ETSUN, it is not certain that such functionality will be possible to use for moving a UE between MEANS groups. However, as to not requiring the UEs to go through CM-IDLE when re-allocation of network slices are possible while in CM-CONNECTED it is proposed that the network should be able to indicate whether the UE shall request access to other MEANS group from CM-IDLE (i.e. to trigger the 5G-AN to do the selection) or whether UE can request it while the UE is connected to the current AMF i.e. in CM-CONNECTED (i.e. as 5GS will enable re-allocation even if e.g. PDU Session for another MEANS group is established) or in CM-IDLE while still indicating the GUAMI.

Such indication can be used together with any of the existing solutions i.e. it should be seen as an add on to any available solution. The indication is either provided together with information about the MEANS groups provided to the UE, or the indication can be sent by the AMF separately. If sent separately, the information could be to which MEANS group(s) the UE may use the more efficient change while being connected to the current AMF i.e. while in CM-CONNECTED.

Additional information/indication can be sent as whether the MEANS group can or shall be accessed while in CM-IDLE without indicating GUAMI or 5G-S-TMSI in 5G-AN signalling. As an option or additional enhancement, the network, e.g. AMF, may indicate to which MEANS groups the UE can use the more efficient re-allocation while staying in CM-CONNECTED for the current Registration (Allowed NSSAI). The network, e.g. AMF, may provide such information as part of the Registration Accept message or as part of UE Configuration Update procedure.

Embodiments enable the UE to know whether an efficient re-allocation/change of Network Slices (e.g. changing the Requested NSSAI compared to Allowed NSSAI by e.g. adding more S-NSSAIs from the Configured NSSAI) or MEANS group can be enabled while the UE is in CM-CONNECTED or whether the UE has to go through CM-IDLE state.

Exemplary scenarios where embodiments can be used are described below.

Mutually Exclusive Access to Network Slices via the use of URSP: The additional information is sent as part of the URSP rules and/or can be sent explicitly by the AMF at Registration or UCU procedures.

Mutually Exclusive Access to Network Slices via UE configuration: The additional information is configured in the UE, and/or can be sent explicitly by the AMF at Registration or UCU procedures.

Mutual exclusion awareness in UE: The additional information is provided to the UE together with the Mutual Exclusion Class Information proposed in the solution to be provided with the Configured NSSAI, and/or can be sent explicitly/separately by the AMF at Registration or UCU procedures.

Slicing Group Support for Mutually Exclusive Access to Network Slices: The additional information is provided to the UE together with the Slicing Group Identifier proposed in the solution to be provided either as a separate parameter from the S-NSSAI (that can be provided as part of the Configured NSSAI and Allowed NSSAI) or the Slicing Group Identifier is part of the SD (which is a part of the S-NSSAI including SST and optionally SD). Therefore, the additional information would be sent together with the S-NSSAI i.e. in or together with the Configured NSSAI and/or Allowed NSSAI using the Registration or UCU procedures.

Mutually Exclusive Access to Network Slices using existing mechanisms: The additional information is provided to the UE by the AMF at Registration or UCU procedures.

Enabling access control to network slices that cannot be accessed simultaneously: The additional information is provided to the UE together with the Network Slice exclusion rules by the AMF at Registration or UCU procedures, or separated from the Network Slice exclusion rules at Registration or UCU procedures.

Solutions for MEANS via Slicing Group Indication: The additional information is provided to the UE together with the MEAG IDs (in or together with Configured NSSAI) by the AMF at Registration or UCU procedures, or separated from the MEAG IDs at Registration or UCU procedures.

The mentioned procedures in the above solutions can be found in TS 23.502:

Registration Accept is part of the Registration procedure, e.g. see clause 4.2.2.2.2.

The UE Configuration Update procedure enables the possibility for the network to update the UE, e.g. see clause 4.2.4.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method comprising:
a User Equipment (UE) determining whether to request access to a Mutually Exclusive Access to Network Slices (MEANS) group from a CM-IDLE state or from a CM-CONNECTED state.

2. The method of claim 1, further comprising:
the UE obtaining an indication,
wherein said determining whether to request access to a MEANS group from a CM-IDLE state or from a CM-CONNECTED state further comprises using the indication.

3. The method of claim 1, wherein obtaining the indication comprises receiving the indication from an AMF.

4. The method of claim 1, wherein:
the indication is contained in a Registration Accept message and/or a UE Configuration Update message, and/or
the indication is configured in the UE.

5. The method of claim 1, wherein:
the UE determines to request access to a MEANS group from a CM-IDLE state, the method further comprising:
requesting access, as a result of said determining, to a MEANS group from a CM-IDLE state without indicating Globally Unique AMF ID (GUAMI) or 5G-S-TMSI in 5G-AN signaling, or
the UE determines to request access to a MEANS group from a CM-CONNECTED state, the method further comprising:
requesting access, as a result of said determining, to a MEANS group from a CM-CONNECTED state.

6. The method of claim 1, wherein the indication contains information about one or more MEANS groups that the UE may change to while being connected to a current AMF.

7. The method of claim 1, wherein the UE makes the determination independent of UE awareness of MEANS groups, and, optionally, wherein:
the UE makes the determination when the UE adds new Single Network Slice Selection Assistance Information (S-NSSAIs) to the Requested NSSAI relative to the Allowed NSSAI, or
the UE makes the determination when the UE removes S-NSSAIs in the Requested NSSAI relative to the Allowed NSSAI, or
the UE makes the determination when the UE completely changes the S-NSSAIs in the Requested NSSAI relative to the Allowed NSSAI.

8. A User Equipment (UE) adapted to:
determine whether to request access to a Mutually Exclusive Access to Network Slices (MEANS) group from a CM-IDLE state or from a CM-CONNECTED state.

9. The UE of claim 8, the UE further adapted to:
obtain an indication,
wherein said determining whether to request access to a MEANS group from a CM-IDLE state or from a CM-CONNECTED state further comprises using the indication.

10. The UE of claim 8, wherein obtaining the indication comprises receiving the indication from an AMF.

11. The UE of claim 8, wherein:
the indication is contained in a Registration Accept message and/or a UE Configuration Update message, and/or
the indication is configured in the UE.

12. The UE of claim 8, wherein:
the UE determines to request access to a MEANS group from a CM-IDLE state, the UE further adapted to:
request access, as a result of said determining, to a MEANS group from a CM-IDLE state without indicating GUAMI or 5G-S-TMSI in 5G-AN signaling, or
the UE determines to request access to a MEANS group from a CM-CONNECTED state, the UE further adapted to:
request access, as a result of said determining, to a MEANS group from a CM-CONNECTED state.

13. The UE of claim 8, wherein the indication contains information about one or more MEANS groups that the UE may change to while being connected to a current AMF.

14. A computer program product comprising a non-transitory computer readable medium storing a computer program comprising instructions which, when executed on at least one processor, causes the at least one processor to carry out the method according to claim 1.

\* \* \* \* \*